(12) United States Patent
Zhang et al.

(10) Patent No.: US 10,614,324 B2
(45) Date of Patent: Apr. 7, 2020

(54) METHOD AND APPARATUS FOR IDENTIFYING STATIC OBSTACLE

(71) Applicant: Baidu Online Network Technology (Beijing) Co., Ltd., Beijing (CN)

(72) Inventors: Ye Zhang, Beijing (CN); Jun Wang, Beijing (CN); Xiaohui Li, Beijing (CN); Liang Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 94 days.

(21) Appl. No.: 16/050,858

(22) Filed: Jul. 31, 2018

(65) Prior Publication Data

US 2019/0087666 A1    Mar. 21, 2019

(30) Foreign Application Priority Data

Sep. 18, 2017   (CN) .......................... 2017 1 0842846

(51) Int. Cl.
| | |
|---|---|
| G06K 9/00 | (2006.01) |
| G06T 7/246 | (2017.01) |
| G05D 1/00 | (2006.01) |
| G01S 17/93 | (2020.01) |
| G06T 7/73 | (2017.01) |

(Continued)

(52) U.S. Cl.
CPC ........ *G06K 9/00805* (2013.01); *G01S 7/4808* (2013.01); *G01S 17/89* (2013.01);
(Continued)

(58) Field of Classification Search
CPC ...................... G06K 9/00805; G06K 2209/40; G01S 17/89; G01S 7/4808; G01S 17/936;
(Continued)

(56) References Cited

U.S. PATENT DOCUMENTS

2017/0369051 A1*  12/2017  Sakai ................... B60W 30/09
2018/0136644 A1*  5/2018   Levinson ............. G06Q 10/00
(Continued)

OTHER PUBLICATIONS

Georgiy Levchuk, Aaron Bobick, and Eric Jones; Apr. 15, 2010; "Activity and function recognition for moving and static objects in urban environments from wide-area persistent surveillance inputs", (Apr. 15, 2010), Proc. SPIE 7704, Evolutionary and Bio-Inspired Computation: Theory and Applications IV, 77040P.*

(Continued)

*Primary Examiner* — Neil R McLean
(74) *Attorney, Agent, or Firm* — Nixon Peabody LLP (57) ABSTRACT

The disclosure discloses a method and apparatus for identifying a static obstacle. An embodiment of the method includes: determining, based on determining information corresponding to a historical laser point cloud sequence of an obstacle, a detected laser point cloud of the obstacle in a current laser point cloud frame belonging to the historical laser point cloud sequence of the obstacle, whether a given obstacle is a static obstacle. The determining information includes: a similarity between a historical motion characteristic of the given obstacle and a noise type motion characteristic, a matching degree between an appearance characteristic of the detected laser point cloud of the obstacle and an appearance characteristic of the historical laser point cloud of the obstacle, and an overlap ratio between the detected laser point cloud of the obstacle and the historical laser point cloud of the obstacle.

11 Claims, 3 Drawing Sheets generating determining information in response to finding out a historical laser point cloud sequence of an obstacle, a detected laser point cloud of the obstacle in a current laser point cloud frame belonging to the historical laser point cloud sequence of the obstacle — 201 determining whether the obstacle is a static obstacle based on the determining information — 202

(51) Int. Cl.
G01S 7/48 (2006.01)
G01S 17/89 (2020.01)

(52) U.S. Cl.
CPC .......... *G01S 17/936* (2013.01); *G05D 1/0088* (2013.01); *G06T 7/246* (2017.01); *G06T 7/248* (2017.01); *G06T 7/73* (2017.01); *G05D 2201/0213* (2013.01); *G06K 2209/40* (2013.01); *G06T 2207/10016* (2013.01); *G06T 2207/10028* (2013.01); *G06T 2207/20182* (2013.01); *G06T 2207/30261* (2013.01)

(58) Field of Classification Search
CPC .......... G06T 7/246; G06T 7/73; G06T 7/248; G06T 2207/10016; G06T 2207/10028; G06T 2207/20182; G06T 2207/30261; G05D 1/0088; G05D 2201/0213; G05D 1/0257; G05D 1/0238
See application file for complete search history.

(56) References Cited

U.S. PATENT DOCUMENTS

| | | | |
|---|---|---|---|
| 2018/0231654 A1* | 8/2018 | Bilik | G01S 7/4026 |
| 2019/0025841 A1* | 1/2019 | Haynes | G01C 21/20 |

OTHER PUBLICATIONS

J. Gallego, M. Pardas and J. Landabaso, 2008; "Segmentation and tracking of static and moving objects in video surveillance scenarios," 2008 15th IEEE International Conference on Image Processing, San Diego, CA, 2008, pp. 2716-2719.*

Heng Wang,Bin Wang,Bingbing Liu,Xiaoli Meng,Guanghong Yang; 2017; "Pedestrian recognition and tracking using 3D LiDAR for autonomous vehicle", Feb. 2017, Elsevier, Robotics and Autonomous Systems.*

* cited by examiner

METHOD AND APPARATUS FOR IDENTIFYING STATIC OBSTACLE

CROSS-REFERENCE TO RELATED APPLICATIONS

This application claims priority to Chinese Patent Application no. 201710842846.3, filed with the State Intellectual Property Office of the People's Republic of China (SIPO) on Sep. 18, 2017, the content of which is incorporated herein by reference in its entirety.

TECHNICAL FIELD

The disclosure relates to the field of vehicle, specifically to the field of autonomous driving technology, and more specifically to a method and apparatus for identifying a static obstacle.

BACKGROUND

Sensing a driving environment is fundamental to making a decision on driving an autonomous vehicle. Identifying whether an obstacle is a static or a moving obstacle is the most critical process in the sensing the driving environment. At present, a commonly used method for identifying whether an obstacle is a static obstacle includes: calculating a speed after motion estimation using a filtering algorithm, and directly identifying the obstacle at a speed of less than a certain threshold after motion estimation as a static obstacle.

The speed after motion estimation usually contains noise data, leading to the lower accuracy of the method for identifying an obstacle at a speed of less than the certain threshold after motion estimation as a static obstacle.

SUMMARY

The disclosure provides a method and apparatus for identifying a static obstacle, to solve a part of the technical problems existing in the Background.

In a first aspect, the disclosure provides a method for identifying a static obstacle. The method includes: generating, in response to finding out a historical laser point cloud sequence of an obstacle, a detected laser point cloud of the obstacle in a current laser point cloud frame belonging to the historical laser point cloud sequence of the obstacle, determining information corresponding to the historical laser point cloud sequence of the obstacle, the detected laser point cloud of the obstacle in the current laser point cloud frame belonging to the historical laser point cloud sequence of the obstacle, where the detected laser point cloud of the obstacle and the historical laser point cloud of the obstacle in the historical laser point cloud sequence of the obstacle, the detected laser point cloud of the obstacle in the current laser point cloud frame belonging to the historical laser point cloud sequence of the obstacle, represent a given obstacle, and the determining information includes: a similarity between a historical motion characteristic of the given obstacle represented by the detected laser point cloud of the obstacle in the current laser point cloud frame and the historical laser point cloud of the obstacle in the historical laser point cloud sequence and a noise type motion characteristic, the detected laser point cloud of the obstacle in the current laser point cloud frame belonging to the historical laser point cloud sequence of the obstacle, a matching degree between an appearance characteristic of the detected laser point cloud of the obstacle in the current laser point cloud frame and an appearance characteristic of the historical laser point cloud of the obstacle in the historical laser point cloud sequence of the obstacle, the detected laser point cloud of the obstacle in the current laser point cloud frame belonging to the historical laser point cloud sequence of the obstacle, and an overlap ratio between the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle; and determining whether the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, is a static obstacle based on the determining information corresponding to the historical laser point cloud sequence of the obstacle, the detected laser point cloud of the obstacle in the current laser point cloud frame belonging to the historical laser point cloud sequence of the obstacle.

In a second aspect, the disclosure provides an apparatus for identifying a static obstacle. The apparatus includes: a generation unit configured for generating, in response to finding out a historical laser point cloud sequence of an obstacle, a detected laser point cloud of the obstacle in a current laser point cloud frame belonging to the historical laser point cloud sequence of the obstacle, determining information corresponding to the historical laser point cloud sequence of the obstacle, the detected laser point cloud of the obstacle in the current laser point cloud frame belonging to the historical laser point cloud sequence of the obstacle, where the detected laser point cloud of the obstacle and the historical laser point cloud of the obstacle in the historical laser point cloud sequence of the obstacle, the detected laser point cloud of the obstacle in the current laser point cloud frame belonging to the historical laser point cloud sequence of the obstacle, represent a given obstacle, and the determining information includes: a similarity between a historical motion characteristic of the given obstacle represented by the detected laser point cloud of the obstacle in the current laser point cloud frame and the historical laser point cloud of the obstacle in the historical laser point cloud sequence of the obstacle and a noise type motion characteristic, the detected laser point cloud of the obstacle in the current laser point cloud frame belonging to the historical laser point cloud sequence of the obstacle, a matching degree between an appearance characteristic of the detected laser point cloud of the obstacle in the current laser point cloud frame and an appearance characteristic of the historical laser point cloud of the obstacle in the historical laser point cloud sequence of the obstacle, the detected laser point cloud of the obstacle in the current laser point cloud frame belonging to the historical laser point cloud sequence of the obstacle, and an overlap ratio between the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle; and a determination unit configured for determining whether the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, is a static obstacle based on the determining information corresponding to the historical laser point cloud sequence of the obstacle, the detected laser point cloud of the obstacle in the current laser point cloud frame belonging to the historical laser point cloud sequence of the obstacle.

A method and apparatus for identifying a static obstacle provided by the disclosure generate, in response to finding out a historical laser point cloud sequence of an obstacle, the detected laser point cloud of the obstacle in the current laser point cloud frame belonging to the historical laser point cloud sequence of the obstacle, determining information corresponding to the historical laser point cloud sequence of the obstacle, the detected laser point cloud of the obstacle in the current laser point cloud frame belonging to the historical laser point cloud sequence of the obstacle, where the detected laser point cloud of the obstacle and the historical laser point cloud of the obstacle in the historical laser point cloud sequence of the obstacle, the detected laser point cloud of the obstacle in the current laser point cloud frame belonging to the historical laser point cloud sequence of the obstacle, represent a given obstacle, and the determining information includes: a similarity between a historical motion characteristic of the given obstacle represented by the detected laser point cloud of the obstacle in the current laser point cloud frame and the historical laser point cloud of the obstacle in the historical laser point cloud sequence of the obstacle and a noise type motion characteristic, the detected laser point cloud of the obstacle in the current laser point cloud frame belonging to the historical laser point cloud sequence of the obstacle, a matching degree between an appearance characteristic of the detected laser point cloud of the obstacle in the current laser point cloud frame and an appearance characteristic of the historical laser point cloud of the obstacle in the historical laser point cloud sequence of the obstacle, the detected laser point cloud of the obstacle in the current laser point cloud frame belonging to the historical laser point cloud sequence of the obstacle, and an overlap ratio between the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle; and determine whether the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, is a static obstacle based on the determining information corresponding to the historical laser point cloud sequence of the obstacle, the detected laser point cloud of the obstacle in the current laser point cloud frame belonging to the historical laser point cloud sequence of the obstacle. The disclosure has achieved, when identifying a static obstacle, finally determining whether an obstacle is a static obstacle after considering a probability of determining the obstacle being a static obstacle from a plurality of aspects, such as an influence of a motion characteristic of the obstacle calculated through a motion estimation being noise data on the static obstacle identification result.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
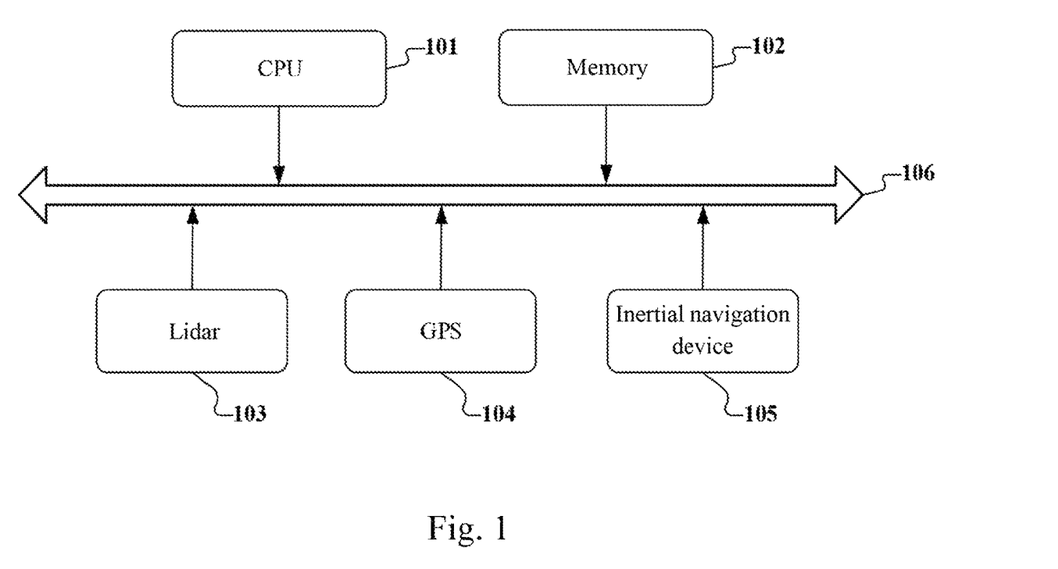
FIG. 1 shows a schematic diagram of a structure of hardware suitable for an autonomous vehicle according to the disclosure.

By referring to FIG. 1, a schematic diagram of a structure of hardware suitable for an autonomous vehicle according to the disclosure is shown.

As shown in FIG. 1, the autonomous vehicle includes a CPU 101, a memory 102, a lidar 103, a GPS 104 and an inertial navigation system 105. The CPU 101, the memory 102, the lidar 103, the GPS 104 and the inertial navigation system 105 are connected to each other through a bus 106.

When the autonomous vehicle is running, the lidar on the autonomous vehicle may collect one laser point cloud frame per rotation. The laser emitted by the lidar in one rotation is projected onto all obstacles around the autonomous vehicle, thereby forming laser points, which may form one laser point cloud frame.

Figure 2:
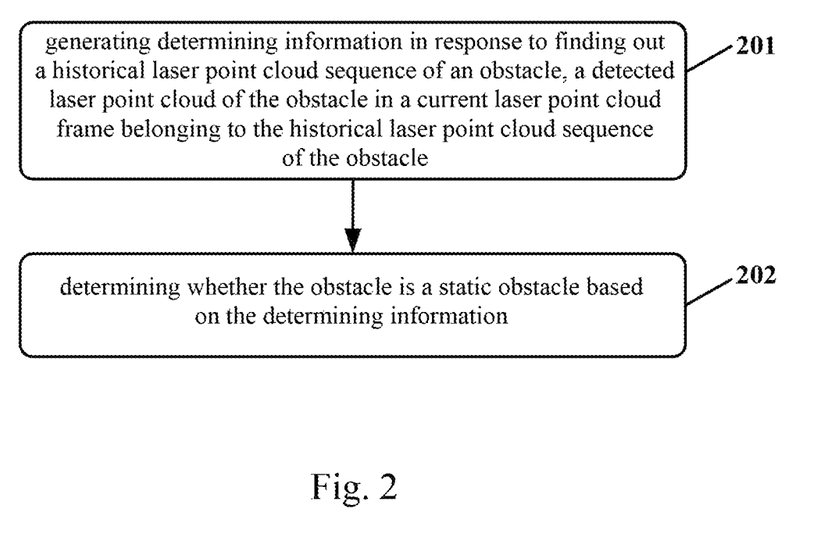
FIG. 2 shows a process diagram of an embodiment of a method for identifying a static obstacle according to the disclosure.

By referring to FIG. 2, a process of an embodiment of a method for identifying a static obstacle according to the disclosure is shown. The method may be executed by an autonomous vehicle, for example, an autonomous vehicle having a structure as shown in FIG. 1. The method includes:

Step 201: generating determining information in response to finding out a historical laser point cloud sequence of an obstacle, a detected laser point cloud of the obstacle in a current laser point cloud frame belonging to the historical laser point cloud sequence of the obstacle.

In the embodiment, a plurality of laser point clouds of obstacles in a current laser point cloud frame may be detected. For example, a plurality of laser point clouds of obstacles in a current laser point cloud frame are detected by segmenting the current laser point cloud frame.

In the embodiment, an obstacle is represented by a laser point cloud of the obstacle, and each historical laser point cloud of an obstacle in a historical laser point cloud sequence of the obstacle is the laser point cloud of the obstacle in the collected historical laser point cloud frame. A historical laser point cloud sequence of an obstacle contains a series of obstacle laser point clouds representing a given obstacle associated on the timeline. The detected laser point cloud of the obstacle in the current laser point cloud frame and the historical laser point cloud of the obstacle in the historical laser point cloud sequence of the obstacle, the detected laser point cloud of the obstacle belonging to the historical laser point cloud sequence of the obstacle, represent a given obstacle. Therefore, the process of finding out the historical laser point cloud sequence of the obstacle, a detected laser point cloud of an obstacle in a current laser point cloud frame belonging to the historical laser point cloud sequence of the obstacle, may be equivalent to a process of tracking the obstacle represented by the detected laser point cloud of the obstacle.

In the embodiment, one detected laser point cloud of an obstacle in a current laser point cloud frame may belong to only one historical laser point cloud sequence of the obstacle. Moreover, one historical laser point cloud sequence of an obstacle may only be used as one historical laser point cloud sequence of the obstacle, a detected laser point cloud of the obstacle belonging to the historical laser point cloud sequence of the obstacle.

When a historical laser point cloud sequence of an obstacle, a detected obstacle laser in a current laser point cloud frame belonging to the historical laser point cloud sequence of the obstacle, is found out, the detected laser point cloud of the obstacle in the current laser point cloud frame may be added to the historical laser point cloud sequence of the obstacle, the detected laser point cloud of the obstacle in the current laser point cloud frame belonging to the historical laser point cloud sequence of the obstacle, as the first historical laser point cloud of the obstacle. Accordingly, the order of the original historical laser point clouds of the obstacle in the historical laser point cloud sequence of the obstacle, the detected laser point cloud of the obstacle in the current laser point cloud frame belonging to the historical laser point cloud sequence of the obstacle, is adjusted.

In the embodiment, the current laser point cloud frame does not refer particularly to a laser point cloud frame that has been collected by a lidar in a length of one collection period, i.e., in one rotation of the lidar. The current laser point cloud frame is relative to the historical laser point cloud frame having been collected prior to having collected the current laser point cloud frame. When a laser point cloud frame next to the current laser point cloud frame has been collected, the current laser point cloud frame will also become a historical laser point cloud frame relative to the next laser point cloud frame. The order of the historical laser point clouds of an obstacle in a historical laser point cloud sequence of the obstacle in the historical laser point cloud sequence of the obstacle corresponds to the order of the collection period corresponding to the historical laser point cloud, the historical laser point cloud of the obstacle belonging to the historical laser point cloud frame. The collection periods corresponding to historical laser point cloud frames, adjacent historical laser point clouds of the obstacle respectively belonging to the historical laser point cloud frames, are also adjacent. The first historical laser point cloud of an obstacle in a historical laser point cloud sequence of the obstacle may belong to the laser point cloud frame immediately prior to the current laser point cloud frame.

In the embodiment, when it is possible to find the historical laser point cloud sequence of the obstacle, the detected laser point cloud of the obstacle in the current laser point cloud frame belonging to the historical laser point cloud sequence of the obstacle, i.e., after tracking the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, it may be said that the historical laser point cloud sequence of the obstacle corresponds to a detected laser point cloud of the obstacle in the current laser point cloud frame.

In the embodiment, determining information corresponding to each historical laser point cloud sequence of an obstacle corresponding to a detected laser point cloud of the obstacle in a current laser point cloud frame may be generated.

In the embodiment, the determining information corresponding to a found historical laser point cloud sequence of an obstacle, a detected laser point cloud of the obstacle in a current laser point cloud frame belonging to the historical laser point cloud sequence of the obstacle, includes: a similarity between a historical motion characteristic of the given obstacle represented by the detected laser point cloud of the obstacle in the current laser point cloud frame and the historical laser point cloud of the obstacle in the historical laser point cloud sequence of the obstacle and a noise type motion characteristic, the detected laser point cloud of the obstacle belonging to the historical laser point cloud sequence of the obstacle; a matching degree between an appearance characteristic of the detected laser point cloud of the obstacle in the current laser point cloud frame and an appearance characteristic of the historical laser point cloud of the obstacle in the historical laser point cloud sequence of the obstacle, the detected laser point cloud of the obstacle in the current laser point cloud frame belonging to the historical laser point cloud sequence of the obstacle; and an overlap ratio between the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle.

In the embodiment, for a historical motion characteristic of a given obstacle represented by a historical laser point cloud of an obstacle in a historical laser point cloud sequence of the obstacle, the detected laser point cloud of the obstacle in the current laser point cloud frame belonging to the historical laser point cloud sequence of the obstacle, a plurality of historical speeds and a plurality of historical locations of the given obstacle may be pre-calculated, and the plurality of historical speeds and the plurality of historical locations may form a plurality of historical motion characteristics. The historical motion characteristic may include, but is not limited to: a historical speed distribution, a historical speed variation within a preset time length, a historical location distribution, and a historical location variation within the preset time length.

A historical speed may be an observed speed of the given obstacle at a moment of collecting a historical laser point cloud frame, a historical laser point cloud of the obstacle in a historical laser point cloud sequence of the obstacle belonging to the historical laser point cloud frame, the detected laser point cloud of the obstacle belonging to the historical laser point cloud sequence of the obstacle. When calculating the observed speed of the given obstacle at the moment of collecting a historical laser point cloud frame, the observed speed of the given obstacle at the moment of collecting the historical laser point cloud frame may be obtained through calculating a distance between an interest point of a bounding box of the obstacle laser point cloud in the historical laser point cloud frame and an interest point of the obstacle laser point cloud in a historical laser point cloud frame immediately prior to the historical laser point cloud frame, and then dividing the distance by a length of the collection period using a lidar. The interest point may include, but is not limited to: a center point of a bounding box, a gravity center point of a bounding box, an edge point of a bounding box, and an angular point of a bounding box. The historical location may be a center point location of a bounding box of a historical laser point cloud of an obstacle representing a given obstacle at a moment of collecting a historical laser point cloud frame, the historical laser point cloud of the obstacle in the historical laser point cloud sequence of the obstacle belonging to the historical laser point cloud frame, the detected laser point cloud of the obstacle belonging to the historical laser point cloud sequence of the obstacle.

In the embodiment, when a speed belongs to noise data, the speed may be known as speed noise data, and when a location belongs to noise data, the location may be known as location noise data.

In the embodiment, the noise type motion characteristic may include, but is not limited to: a speed noise data distribution, a speed noise data variation within a preset time length, a location noise data distribution, and a location noise data variation within a preset time length.

For example, a speed noise data distribution in a noise type motion characteristic is relatively scattered, and a speed noise data variation within a preset time length is greater than preset limit.

When calculating a similarity between a historical motion characteristic of a given obstacle represented by a detected laser point cloud of the obstacle in a current laser point cloud frame and a historical laser point cloud of the obstacle in a historical laser point cloud sequence of the obstacle and a noise type motion characteristic, the detected laser point cloud of the obstacle belonging to the historical laser point cloud sequence of the obstacle, a similarity between a historical speed distribution of the given obstacle and a speed distribution of speed noise data, a similarity between a historical speed variation of the given obstacle within a preset time length and a speed variation of speed noise data within the preset time length, a similarity between a location distribution of the given obstacle and a location distribution of location noise data, and a similarity between a historical location variation of the given obstacle within a preset time length and a location variation of location noise data within the preset time length may be calculated respectively. Then, the calculated similarities may be subjected to a weighted calculation, and the weighted calculation result is used as a similarity between the historical motion characteristic of the given obstacle and the noise type motion characteristic.

When calculating a similarity between a historical speed variation of the given obstacle within a preset time length and a speed variation of speed noise data within the preset time length, first a component, e.g., an angular speed, of a plurality of historical speeds of the given obstacle may be calculated, and then a component angular speed variation within the preset time length may be calculated. A proximity of a component variation within a preset time length to a component variation of speed noise data within the preset time length may be used as a similarity between a speed variation of a given obstacle within the preset time length and a speed variation of speed noise data within the preset time length.

In some optional implementations of the embodiment, a historical motion characteristic of a given obstacle represented by a historical laser point cloud of the obstacle in a historical laser point cloud sequence of the obstacle, a detected laser point cloud of the obstacle in a current laser point cloud frame belonging to the historical laser point cloud sequence of the obstacle, may include: a historical speed distribution of the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, obtained through a motion estimation, a historical location distribution of the given obstacle, a historical speed variation of the given obstacle within a preset time length obtained through a motion estimation, and a historical location variation of the given obstacle within a preset time length.

Each historical speed obtained through a motion estimation may be a speed of the given obstacle obtained through a motion estimation at a moment of collecting the historical laser point cloud frame, the historical laser point cloud of the obstacle in the historical laser point cloud sequence of the obstacle belonging to the historical laser point cloud frame, the detected laser point cloud of the obstacle belonging to the historical laser point cloud sequence of the obstacle. The filtering method used for motion estimation may include, but is not limited to: Gaussian Filter, Kalman Filter, Extended Kalman Filter, and Unscented Kalman Filter.

In some optional implementations of the embodiment, the noise type motion characteristic includes: a noise type distribution obtained based on a statistical rule, and a noise data variation within a preset time length obtained based on a kinematic rule.

For example, the noise type distribution obtained based on a statistical rule may be a Gaussian distribution with an average value zero, and the noise data variation within a preset time length obtained based on a kinematic rule includes: a speed noise data variation within the preset time length, and a location noise data variation within the preset time length.

For example, when a speed is noise data in a noise type motion characteristic, the speed distribution is relatively scattered, and the noise data distribution obtained based on a statistical rule may be a Gaussian distribution with an average value zero. The speed noise data variation within a preset time length is greater than a preset limit.

When calculating a similarity between a historical motion characteristic of the given obstacle represented by a detected laser point cloud of the obstacle in a current laser point cloud frame and a historical laser point cloud of the obstacle in a historical laser point cloud sequence of the obstacle and a noise type motion characteristic, the detected laser point cloud of the obstacle belonging to the historical laser point cloud sequence of the obstacle, a similarity between a historical speed distribution of the given obstacle and a noise type distribution obtained based on a statistical rule, e.g., a Gaussian distribution with an average value zero, a similarity between a historical speed variation of the given obstacle within a preset time length and a speed variation of speed noise data within the preset time length, a similarity between a location distribution of the given obstacle and a noise type distribution obtained based on a statistical rule, e.g., a Gaussian distribution with an average value zero, and a similarity between a historical location variation of the given obstacle within a preset time length and a location variation of location noise data within the preset time length may be calculated respectively. Then, the calculated similarities may be subjected to a weighted calculation, and the weighted calculation result is used as a similarity between the historical motion characteristic of the given obstacle and the noise type motion characteristic.

In the embodiment, a similarity between a historical motion characteristic of a given obstacle represented by a historical laser point cloud of the obstacle in a historical laser point cloud sequence of the obstacle and a noise type motion characteristic is calculated, a detected laser point cloud of the obstacle in a current laser point cloud frame belonging to the historical laser point cloud sequence of the obstacle. the higher the similarity is, the higher the probability of the calculated historical speed and historical location belonging to noise data is.

That is, because a given obstacle represented by a historical laser point cloud of the obstacle in a historical laser point cloud sequence of the obstacle, a detected laser point cloud of the obstacle in a current laser point cloud frame belonging to the historical laser point cloud sequence of the obstacle, is a static obstacle, the calculated speed and location of the given obstacle will belong to speed noise data and location noise data. Accordingly, the higher the similarity is, the higher the probability of the given obstacle being a static obstacle is.

In the embodiment, when calculating a matching degree between a characteristic of a detected laser point cloud of an obstacle in a current laser point cloud frame and a laser point cloud of the obstacle in a historical laser point cloud sequence of the obstacle, the detected laser point cloud of the obstacle in the current laser point cloud frame belonging to the historical laser point cloud sequence of the obstacle, an appearance characteristic matching degree may be calculated respectively for each appearance characteristic involved in the matching degree calculation, and then a matching degree between an appearance characteristic of a detected laser point cloud of an obstacle in a current laser point cloud frame and an appearance characteristic of a laser point cloud of the obstacle in a historical laser point cloud sequence of the obstacle is obtained through a weighted calculation of a plurality of the appearance characteristic matching degrees.

In the embodiment, when calculating a matching degree between an appearance characteristic of a detected laser point cloud of an obstacle in a current laser point cloud frame and an appearance characteristic of a historical laser point cloud of the obstacle in a historical laser point cloud sequence of the obstacle, the detected laser point cloud of the obstacle in the current laser point cloud frame belonging to the historical laser point cloud sequence of the obstacle, may be calculated only. For example, a matching degree between an appearance characteristic of a detected laser point cloud of an obstacle in a current laser point cloud frame and an appearance characteristic of a laser point cloud frame immediately prior to the current laser point cloud frame in a historical laser point cloud sequence of the obstacle, the detected laser point cloud of the obstacle in the current laser point cloud frame belonging to the historical laser point cloud sequence of the obstacle, is calculated only, and then the matching degree is used as a matching degree between an appearance characteristic of a detected laser point cloud of an obstacle in a current laser point cloud frame and an appearance characteristic of a historical laser point cloud of the obstacle in a historical laser point cloud sequence of the obstacle. A matching degree between an appearance characteristic of a detected laser point cloud of an obstacle in a current laser point cloud frame and an appearance characteristic of a plurality of historical laser point clouds of the obstacle in a historical laser point cloud sequence of the obstacle, the detected laser point cloud of the obstacle in the current laser point cloud frame belonging to the historical laser point cloud sequence of the obstacle, may also be calculated, and then an average value or a median of the calculated matching degrees may be used as a matching degree between an appearance characteristic of a detected laser point cloud of an obstacle in a current laser point cloud frame and an appearance characteristic of a historical laser point cloud of the obstacle in a historical laser point cloud sequence of the obstacle, the detected laser point cloud of the obstacle in the current laser point cloud frame belonging to the historical laser point cloud sequence of the obstacle.

In some optional implementations of the embodiment, the appearance characteristic includes: a size, a laser point density, and a geometrical shape. A size of a laser point cloud of an obstacle may be a bounding box size of the laser point cloud of the obstacle.

When calculating a matching degree between an appearance characteristic of a detected laser point cloud of an obstacle in a current laser point cloud frame and an appearance characteristic of a laser point cloud of the obstacle in a historical laser point cloud sequence of the obstacle, the detected laser point cloud of the obstacle belonging to the historical laser point cloud sequence of the obstacle, an appearance matching degree may be calculated respectively for an appearance characteristic, such as a size, a laser point density, and a geometrical shape, and then a matching degree between an appearance characteristic of a detected laser point cloud of an obstacle in a current laser point cloud frame and an appearance characteristic of a laser point cloud of the obstacle in a historical laser point cloud sequence of the obstacle, the detected laser point cloud of the obstacle belonging to the historical laser point cloud sequence of the obstacle, is obtained through a weighted calculation of a plurality of the appearance matching degrees.

When calculating a matching degree between a geometrical shape of a detected laser point cloud of an obstacle in a current laser point cloud frame and a geometrical shape of a historical laser point cloud of the obstacle in a historical laser point cloud sequence of the obstacle, the detected laser point cloud of the obstacle belonging to the historical laser point cloud sequence of the obstacle, a matching degree between a laser point distribution characteristic of a detected laser point cloud of an obstacle in a current laser point cloud frame and the laser point distribution characteristic of a historical laser point cloud of the obstacle in a historical laser point cloud sequence of the obstacle, the detected laser point cloud of the obstacle belonging to the historical laser point cloud sequence of the obstacle, may be used as the geometrical shape matching degree. For a laser point cloud of an obstacle, space occupied by a bounding box of the laser point cloud of the obstacle may be divided into 3D grids of equal volume, the number of laser points in the laser point cloud of the obstacle in each of the 3D grids is collected, and a distributed eigenvector with the number of dimensions identical to the number of 3D grids is generated. The value of each dimension in the distributed eigenvector is a normalized value corresponding to the number of laser points in the laser point cloud of the obstacle of the 3D grid corresponding to the dimension, and a distribution characteristic of the laser point cloud of the obstacle may be represented by the distributed eigenvector. A matching degree between a distributed eigenvector representing a laser point distribution characteristic of a detected laser point cloud of an obstacle in a current laser point cloud frame and a distributed eigenvector representing the laser point distribution characteristic of a historical laser point cloud of the obstacle in a historical laser point cloud sequence of the obstacle, the detected laser point cloud of the obstacle in the current laser point cloud frame belonging to the historical laser point cloud sequence of the obstacle, may be calculated.

In some optional implementations of the embodiment, when calculating an overlap ratio between a detected laser point cloud of an obstacle in a current laser point cloud frame and a historical laser point cloud of an obstacle in a historical laser point cloud sequence of the obstacle, the detected laser point cloud of the obstacle in the current laser point cloud frame belonging to the historical laser point cloud sequence of the obstacle, an overlap ratio between a bounding box of a detected laser point cloud of an obstacle in a current laser point cloud frame and a bounding box of a historical laser point cloud of the obstacle in a historical laser point cloud sequence of the obstacle, the detected laser point cloud of the obstacle in the current laser point cloud frame belonging to the historical laser point cloud sequence of the obstacle, may be calculated, and an overlap ratio between a bounding box of a detected laser point cloud of an obstacle in a current laser point cloud frame and a bounding box of a historical laser point cloud of the obstacle in a historical laser point cloud sequence of the obstacle, the detected laser point cloud of the obstacle in the current laser point cloud frame belonging to the historical laser point cloud sequence of the obstacle, is used as an overlap ratio between a detected laser point cloud of an obstacle in a current laser point cloud frame and a historical laser point cloud of the obstacle in a historical laser point cloud sequence of the obstacle, the detected laser point cloud of the obstacle in the current laser point cloud frame belonging to the historical laser point cloud sequence of the obstacles.

When calculating an overlap ratio between a bounding box of a detected laser point cloud of an obstacle in a current laser point cloud frame and a bounding box of a historical laser point cloud of the obstacle in a historical laser point cloud sequence of the obstacle, the detected laser point cloud of the obstacle in the current laser point cloud frame belonging to the historical laser point cloud sequence of the obstacle, an overlap ratio between a bounding box of a detected laser point cloud of an obstacle in a current laser point cloud frame and a bounding box of a historical laser point cloud of the obstacle in a historical laser point cloud sequence of the obstacle, the detected laser point cloud of the obstacle in the current laser point cloud frame belonging to the historical laser point cloud sequence of the obstacle, e.g., a laser point cloud of the obstacle in the historical laser point cloud sequence of the obstacle belonging to a laser point cloud frame immediately prior to the current laser point frame, may be calculated only, and the overlap ratio is used as an overlap ratio between a bounding box of a detected laser point cloud of an obstacle in a current laser point cloud frame and a bounding box of a historical laser point cloud of the obstacle in a historical laser point cloud sequence of the obstacle, the detected laser point cloud of the obstacle in the current laser point cloud frame belonging to the historical laser point cloud sequence of the obstacle.

An overlap ratio between a bounding box of a detected laser point cloud of an obstacle in a current laser point cloud frame and bounding boxes of a plurality of historical laser point clouds of the obstacle in a historical laser point cloud sequence of the obstacle, the detected laser point cloud of the obstacle in the current laser point cloud frame belonging to the historical laser point cloud sequence of the obstacle, may also be calculated respectively to obtain a plurality of overlap ratios between bounding boxes, and then an average value of the plurality of overlap ratios is calculated, and used as an overlap ratio between a bounding box of a detected laser point cloud of an obstacle in a current laser point cloud frame and a bounding box of a historical laser point cloud of the obstacle in a historical laser point cloud sequence of the obstacle, the detected laser point cloud of the obstacle in the current laser point cloud frame belonging to the historical laser point cloud sequence of the obstacle.

When calculating an overlap ratio between a bounding box of a detected laser point cloud of an obstacle in a current laser point cloud frame and a bounding box of a historical laser point cloud of the obstacle in a historical laser point cloud sequence of the obstacle, the detected laser point cloud of the obstacle in the current laser point cloud frame belonging to the historical laser point cloud sequence of the obstacle, a displacement amount corresponding to the historical laser point cloud of the obstacle may be determined based on a historical speed of a given obstacle represented by a detected laser point cloud of the obstacle in a current laser point cloud frame and a historical laser point cloud of the obstacle in a historical laser point cloud sequence of the obstacle, the detected laser point cloud of the obstacle in the current laser point cloud frame belonging to the historical laser point cloud sequence of the obstacle, obtained through a motion estimation at a moment of collecting a historical laser point cloud frame, the historical laser point cloud of the obstacle belonging to the historical laser point cloud frame, and a length of the collection period using a lidar, i.e., determining a displacement amount corresponding to the bounding box of the historical laser point cloud of the obstacle. Then, an Intersection-over-Union between a bounding box of a detected laser point cloud of an obstacle in a current laser point cloud frame and a bounding box of the historical laser point cloud of the obstacle and an Intersection-over-Union between the detected laser point cloud of the obstacle and the historical laser point cloud of the obstacle after moving the determined displacement amount may be respectively calculated. A ratio may be calculated by dividing the Intersection-over-Union between a bounding box of a detected laser point cloud of an obstacle and a bounding box of the historical laser point cloud of the obstacle before displacement by a sum of the Intersection-over-Union between the detected laser point cloud of the obstacle and the historical laser point cloud of the obstacle before displacement and the Intersection-over-Union between the detected laser point cloud of the obstacle and the historical laser point cloud of the obstacle after displacement, and used as an overlap ratio between a bounding box of a detected laser point cloud of an obstacle in a current laser point cloud frame and a bounding box of a historical laser point cloud of the obstacle in a historical laser point cloud sequence of the obstacle, the detected laser point cloud of the obstacle in the current laser point cloud frame belonging to the historical laser point cloud sequence of the obstacle.

In the embodiment, the steps 201-202 may be executed at intervals of a length of a collection period using a lidar, i.e., one rotation of the lidar. That is, a current laser point cloud frame is a latest collected laser point cloud frame. Each time when a latest collected laser point cloud frame is collected, tracking an obstacle may respond to finding out a historical laser point cloud sequence of the obstacle, a detected laser point cloud of the obstacle in the latest collected laser point cloud frame belonging to the historical laser point cloud sequence of the obstacle, i.e., after tracking a given obstacle represented by a detected laser point cloud of the obstacle and a historical laser point cloud of the obstacle in a historical laser point cloud sequence of the obstacle, the detected laser point cloud of the obstacle belonging to the historical laser point cloud sequence of the obstacle, whether each obstacle is a static obstacle may be respectively determined. Therefore, whether an obstacle is a static obstacle is determined in real time. Each time when the steps 201-202 are executed, a detected laser point cloud of an obstacle may be added to a historical laser point cloud sequence of the obstacle, the detected laser point cloud of the obstacle belonging to the historical laser point cloud sequence of the obstacle, as a first historical laser point cloud of the obstacle, and the order of the original historical laser point cloud of the obstacle in the historical laser point cloud sequence of the obstacle may be adjusted.

Step 202: determining whether the obstacle is a static obstacle based on the determining information.

In the embodiment, determining information corresponding to each historical laser point cloud sequence of an obstacle corresponding to a detected laser point cloud of the obstacle in a current laser point cloud frame may be respectively generated. Whether each given obstacle represented by a historical laser point cloud of the obstacle in a historical laser point cloud sequence of the obstacle corresponding to a detected laser point cloud of the obstacle in a current laser point cloud frame and the detected laser point cloud of the obstacle is a static obstacle may be respectively determined based on determining information corresponding to each historical laser point cloud sequence of the obstacle corresponding to a detected laser point cloud of the obstacle in the current laser point cloud frame.

In the embodiment, the determining information corresponding to a historical laser point cloud sequence of an obstacle, a detected laser point cloud of the obstacle in a current laser point cloud frame belonging to the historical laser point cloud sequence of the obstacle, includes: a similarity between a historical motion characteristic of a given obstacle represented by a detected laser point cloud of the obstacle in the current laser point cloud frame and the historical laser point cloud of the obstacle in the historical laser point cloud sequence of the obstacle and a noise type motion characteristic, the detected laser point cloud of the obstacle belonging to the historical laser point cloud sequence of the obstacle, a matching degree between an appearance characteristic of a detected laser point cloud of the obstacle in the current laser point cloud frame and an appearance characteristic of the historical laser point cloud of the obstacle in the historical laser point cloud sequence of the obstacle, the detected laser point cloud of the obstacle in the current laser point cloud frame belonging to the historical laser point cloud sequence of the obstacle, and an overlap ratio between a detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle.

In the embodiment, when determining whether a given obstacle represented by a detected laser point cloud of the obstacle in a current laser point cloud frame and a historical laser point cloud of the obstacle in a historical laser point cloud sequence of the obstacle, the detected laser point cloud of the obstacle belonging to the historical laser point cloud sequence of the obstacle, is a static obstacle, the similarity between the historical motion characteristic of the given obstacle represented by the detected laser point cloud of the obstacle in the current laser point cloud frame and the historical laser point cloud of the obstacle in the historical laser point cloud sequence of the obstacle and the noise type motion characteristic, the detected laser point cloud of the obstacle belonging to the historical laser point cloud sequence of the obstacle, the matching degree between the appearance characteristic of the detected laser point cloud of the obstacle and the appearance characteristic of the historical laser point cloud of the obstacle, and the overlap ratio between the detected laser point cloud of the obstacle and the historical laser point cloud of the obstacle in the historical laser point cloud sequence of the obstacle, the detected laser point cloud of the obstacle belonging to the historical laser point cloud sequence of the obstacle, may be subjected to a weighted calculation, and the weighted calculation result is used as a final determining value as to whether the given obstacle is a static obstacle. The final determining value may be compared with a determining threshold, and when the final determining value is greater than the determining threshold, it can be determined that the detected laser point cloud of the obstacle in the current laser point cloud frame and the historical laser point cloud of the obstacle in the historical laser point cloud sequence of the obstacle, the detected laser point cloud of the obstacle belonging to the historical laser point cloud sequence of the obstacle, represent the given obstacle. In a weighted calculation, the similarity, the matching degree, and the overlap ratio may correspond to different weights. For example, weights corresponding to the similarity and the overlap ratio may be greater than the weight corresponding to the matching degree.

Figure 3:
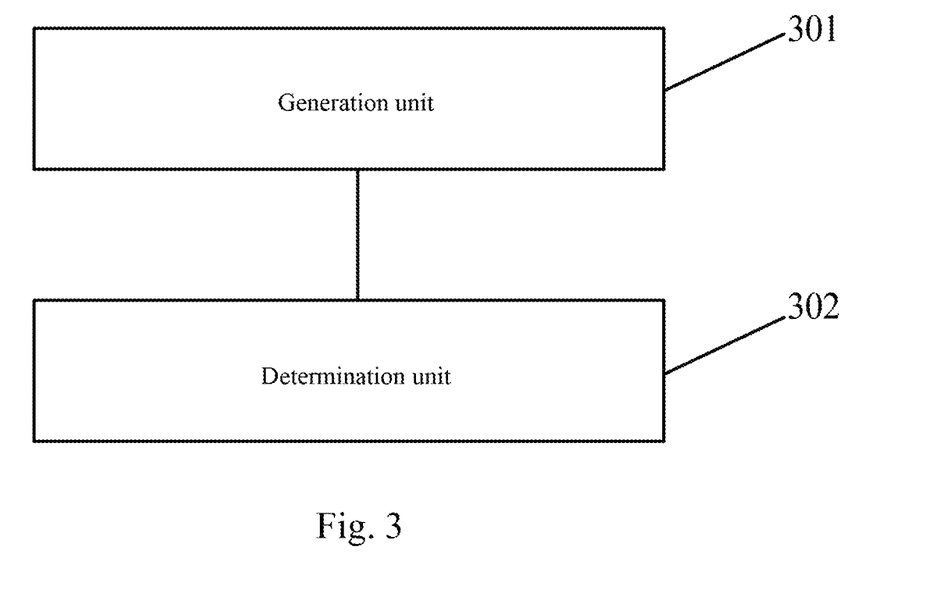
FIG. 3 shows a schematic diagram of a structure of an apparatus for identifying a static obstacle according to the disclosure.

Further referring to FIG. 3, as implementations of the methods shown in the above figures, the disclosure provides an embodiment of an apparatus for identifying a static obstacle. The embodiment corresponds to the embodiment of the method shown in FIG. 2.

As shown in FIG. 3, the apparatus for identifying a static obstacle includes: a generation unit 301 and a determination unit 302. Here, the generation unit 301 is configured for generating, in response to finding out a historical laser point cloud sequence of an obstacle, a detected laser point cloud of the obstacle in a current laser point cloud frame belonging to the historical laser point cloud sequence of the obstacle, determining information corresponding to the historical laser point cloud sequence of the obstacle, the detected laser point cloud of the obstacle in the current laser point cloud frame belonging to the historical laser point cloud sequence of the obstacle, where the detected laser point cloud of the obstacle and the historical laser point cloud of the obstacle in the historical laser point cloud sequence of the obstacle, the detected laser point cloud of the obstacle in the current laser point cloud frame belonging to the historical laser point cloud sequence of the obstacle, represent a given obstacle, and the determining information includes: a similarity between a historical motion characteristic of the given obstacle represented by the detected laser point cloud of the obstacle in the current laser point cloud frame and the historical laser point cloud of the obstacle in the historical laser point cloud sequence of the obstacle and a noise type motion characteristic, the detected laser point cloud of the obstacle in the current laser point cloud frame belonging to the historical laser point cloud sequence of the obstacle, a matching degree between an appearance characteristic of the detected laser point cloud of the obstacle in the current laser point cloud frame and an appearance characteristic of the historical laser point cloud of the obstacle in the historical laser point cloud sequence of the obstacle, the detected laser point cloud of the obstacle in the current laser point cloud frame belonging to the historical laser point cloud sequence of the obstacle, and an overlap ratio between the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle; and the determination unit 302 is configured for determining whether the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, is a static obstacle based on the determining information corresponding to the historical laser point cloud sequence of the obstacle, the detected laser point cloud of the obstacle in the current laser point cloud frame belonging to the historical laser point cloud sequence of the obstacle.

In some optional implementations of the embodiment, a historical motion characteristic of the given obstacle represented by a detected laser point cloud of the obstacle in a current laser point cloud frame and a historical laser point cloud of the obstacle in a historical laser point cloud sequence of the obstacle, the detected laser point cloud of the obstacle in the current laser point cloud frame belonging to the historical laser point cloud sequence of the obstacle, includes: a historical speed distribution of the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, obtained through a motion estimation, a historical location distribution of the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, a historical speed variation of the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, within a preset time length obtained through a motion estimation, and a historical location variation of the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, within a preset time length.

In some optional implementations of the embodiment, the noise type motion characteristic includes: a noise type distribution obtained based on a statistical rule, and a noise data variation within a preset time length obtained based on a kinematic rule.

In some optional implementations of the embodiment, the appearance characteristic includes: a size, a laser point density, and a geometrical shape.

In some optional implementations of the embodiment, the generation unit includes: an overlap ratio calculation subunit configured for determining a displacement amount corresponding to a historical laser point cloud of an obstacle in a historical laser point cloud sequence of the obstacle, a detected laser point cloud of the obstacle in a current laser point cloud frame belonging to the historical laser point cloud sequence of the obstacle, based on a historical speed of the given obstacle represented by the detected laser point cloud of the obstacle in the current laser point cloud frame and the historical laser point cloud of the obstacle in the historical laser point cloud sequence of the obstacle, the detected laser point cloud of the obstacle in the current laser point cloud frame belonging to the historical laser point cloud sequence of the obstacle, obtained through a motion estimation at a moment of collecting the historical laser point cloud frame, the historical laser point cloud of the obstacle in the historical laser point cloud sequence of the obstacle belonging to the historical laser point cloud frame, the detected laser point cloud of the obstacle in the current laser point cloud frame belonging to the historical laser point cloud sequence of the obstacle, and a length of the collection period using a lidar; respectively calculating an Intersection-over-Union between the detected laser point cloud of the obstacle and the historical laser point cloud of the obstacle in the historical laser point cloud sequence of the obstacle, the detected laser point cloud of the obstacle belonging to the historical laser point cloud sequence of the obstacle, and an Intersection-over-Union between the detected laser point cloud of the obstacle and the historical laser point cloud of the obstacle in the historical laser point cloud sequence of the obstacle, the detected laser point cloud of the obstacle belonging to the historical laser point cloud sequence of the obstacle after moving the displacement amount; and calculating an overlap ratio between the detected laser point cloud of the obstacle and the historical laser point cloud of the obstacle in the historical laser point cloud sequence of the obstacle, the detected laser point cloud of the obstacle belonging to the historical laser point cloud sequence of the obstacle, based on the Intersection-over-Union between the detected laser point cloud of the obstacle and the historical laser point cloud of the obstacle in the historical laser point cloud sequence of the obstacle, the detected laser point cloud of the obstacle belonging to the historical laser point cloud sequence of the obstacle, and the Intersection-over-Union between the detected laser point cloud of the obstacle and the historical laser point cloud of the obstacle in the historical laser point cloud sequence of the obstacle, the detected laser point cloud of the obstacle belonging to the historical laser point cloud sequence of the obstacle after moving the displacement amount.

The disclosure further provides an autonomous vehicle, which may be equipped with one or more processors; and a memory for storing one or more programs, where the one or more programs may contain instructions for executing the operations according to the steps 201-202. The one or more programs enable, when executed by the one or more processors, the one or more processors to execute the operations according to the steps 201-202.

the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: generate, in response to finding out a historical laser point cloud sequence of an obstacle, a detected laser point cloud of the obstacle in a current laser point cloud frame belonging to the historical laser point cloud sequence of the obstacle, determining information corresponding to the historical laser point cloud sequence of the obstacle, wherein the detected laser point cloud of the obstacle and a historical laser point cloud of the obstacle in the historical laser point cloud sequence of the obstacle represent a given obstacle, and the determining information comprises: a similarity between a historical motion characteristic of the given obstacle and a noise type motion characteristic, a matching degree between an appearance characteristic of the detected laser point cloud of the obstacle and an appearance characteristic of the historical laser point cloud of the obstacle, and an overlap ratio between the detected laser point cloud of the obstacle and the historical laser point cloud of the obstacle; and determine whether the given obstacle is a static obstacle based on the determining information.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a generation unit, and a determination unit, where the names of these units or modules do not in some cases constitute a limitation to such units or modules themselves. For example, the generation unit may also be described as "a unit for generating, in response to finding out a historical laser point cloud sequence of an obstacle, a detected laser point cloud of the obstacle in a current laser point cloud frame belonging to the historical laser point cloud sequence of the obstacle, determining information."

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for identifying a static obstacle, comprising:
generating, in response to finding out a historical laser point cloud sequence of an obstacle, a detected laser point cloud of the obstacle in a current laser point cloud frame belonging to the historical laser point cloud sequence of the obstacle, determining information corresponding to the historical laser point cloud sequence of the obstacle, wherein the detected laser point cloud of the obstacle and a historical laser point cloud of the obstacle in the historical laser point cloud sequence of the obstacle represent a given obstacle, and the determining information comprises: a similarity between a historical motion characteristic of the given obstacle and a noise type motion characteristic, a matching degree between an appearance characteristic of the detected laser point cloud of the obstacle and an appearance characteristic of the historical laser point cloud of the obstacle, and an overlap ratio between the detected laser point cloud of the obstacle and the historical laser point cloud of the obstacle; and
determining whether the given obstacle is a static obstacle based on the determining information.

2. The method according to claim 1, wherein the historical motion characteristic comprises: a historical speed distribution of the given obstacle obtained through a motion estimation, a historical location distribution of the given obstacle, a historical speed variation of the given obstacle obtained through a motion estimation within a preset time length, and a historical location variation of the given obstacle within the preset time length.

3. The method according to claim 2, wherein the noise type motion characteristic comprises: a noise type distribution obtained based on a statistical rule, and a noise data variation within the preset time length obtained based on a kinematic rule.

4. The method according to claim 3, wherein the appearance characteristic comprises: a size, a laser point density, and a geometrical shape.

5. The method according to claim 4, wherein the determining whether the given obstacle is a static obstacle based on the determining information comprises:
determining a displacement amount corresponding to the historical laser point cloud of the obstacle based on a historical speed of the given obstacle obtained through a motion estimation at a moment of collecting a historical laser point cloud frame, the historical laser point cloud of the obstacle belonging to the historical laser point cloud frame, and a length of the collection period using a lidar;
respectively calculating an Intersection-over-Union between the detected laser point cloud of the obstacle and the historical laser point cloud of the obstacle and an Intersection-over-Union between the detected laser point cloud of the obstacle and the historical laser point cloud of the obstacle after moving the displacement amount; and
calculating an overlap ratio between the detected laser point cloud of the obstacle and the historical laser point cloud of the obstacle based on the Intersection-over-Union between the detected laser point cloud of the obstacle and the historical laser point cloud of the obstacle and the Intersection-over-Union between the detected laser point cloud of the obstacle and the historical laser point cloud of the obstacle after moving the displacement amount.

6. An apparatus for identifying a static obstacle, comprising:
at least one processor; and
a memory storing instructions, the instructions when executed by the at least one processor, cause the at least one processor to perform operations, the operations comprising:
generating, in response to finding out a historical laser point cloud sequence of an obstacle, a detected laser point cloud of the obstacle in a current laser point cloud frame belonging to the historical laser point cloud sequence of the obstacle, determining information corresponding to the historical laser point cloud sequence of the obstacle, wherein the detected laser point cloud of the obstacle and a historical laser point cloud of the obstacle in the historical laser point cloud sequence of the obstacle represent a given obstacle, and the determining information comprises: a similarity between a historical motion characteristic of the given obstacle and a noise type motion characteristic, a matching degree between an appearance characteristic of the detected laser point cloud of the obstacle and an appearance characteristic of the historical laser point cloud of the obstacle, and an overlap ratio between the detected laser point cloud of the obstacle and the historical laser point cloud of the obstacle; and
determining whether the given obstacle is a static obstacle based on the determining information.

7. The apparatus according to claim 6, wherein the historical motion characteristic comprises: a historical speed distribution of the given obstacle obtained through a motion estimation, a historical location distribution of the given obstacle, a historical speed variation of the given obstacle obtained through a motion estimation within a preset time length, and a historical location variation of the given obstacle within the preset time length.

8. The method according to claim 7, wherein the noise type motion characteristic comprises: a noise type distribution obtained based on a statistical rule, and a noise data variation within the preset time length obtained based on a kinematic rule.

9. The apparatus according to claim 8, wherein the appearance characteristic comprises: a size, a laser point density, and a geometrical shape.

10. The apparatus according to claim 9, wherein the determining whether the given obstacle is a static obstacle based on the determining information comprises:
determining a displacement amount corresponding to the historical laser point cloud of the obstacle based on a historical speed of the given obstacle obtained through a motion estimation at a moment of collecting a historical laser point cloud frame, the historical laser point cloud of the obstacle belonging to the historical laser point cloud frame, and a length of the collection period using a lidar; respectively calculating an Intersection-over-Union between the detected laser point cloud of the obstacle and the historical laser point cloud of the obstacle and an Intersection-over-Union between the detected laser point cloud of the obstacle and the historical laser point cloud of the obstacle after moving the displacement amount; and calculating an overlap ratio between the detected laser point cloud of the obstacle and the historical laser point cloud of the obstacle based on the Intersection-over-Union between the detected laser point cloud of the obstacle and the historical laser point cloud of the obstacle and the Intersection-over-Union between the detected laser point cloud of the obstacle and the historical laser point cloud of the obstacle after moving the displacement amount.

11. A non-transitory computer-readable storage medium storing a computer program, the computer program when executed by one or more processors, causes the one or more processors to perform operations, the operations comprising:
generating, in response to finding out a historical laser point cloud sequence of an obstacle, a detected laser point cloud of the obstacle in a current laser point cloud frame belonging to the historical laser point cloud sequence of the obstacle, determining information corresponding to the historical laser point cloud sequence of the obstacle, wherein the detected laser point cloud of the obstacle and a historical laser point cloud of the obstacle in the historical laser point cloud sequence of the obstacle represent a given obstacle, and the determining information comprises: a similarity between a historical motion characteristic of the given obstacle and a noise type motion characteristic, a matching degree between an appearance characteristic of the detected laser point cloud of the obstacle and an appearance characteristic of the historical laser point cloud of the obstacle, and an overlap ratio between the detected laser point cloud of the obstacle and the historical laser point cloud of the obstacle; and
determining whether the given obstacle is a static obstacle based on the determining information.

* * * * *